June 18, 1968          C. V. WATSON          3,389,035
SYSTEM, APPARATUS AND PROCESS FOR THE
MANUFACTURE OF METERING DIAPHRAGMS
Original Filed March 14, 1961          5 Sheets-Sheet 1

INVENTOR
C. VERNON WATSON

BY
ATTORNEYS

June 18, 1968 C. V. WATSON 3,389,035
SYSTEM, APPARATUS AND PROCESS FOR THE
MANUFACTURE OF METERING DIAPHRAGMS
Original Filed March 14, 1961 5 Sheets-Sheet 2

INVENTOR
C. VERNON WATSON

BY
ATTORNEYS

June 18, 1968  C. V. WATSON  3,389,035
SYSTEM, APPARATUS AND PROCESS FOR THE
MANUFACTURE OF METERING DIAPHRAGMS
Original Filed March 14, 1961   5 Sheets-Sheet 3

INVENTOR
C. VERNON WATSON

BY *[signature]*

ATTORNEYS

INVENTOR
C. VERNON WATSON

ATTORNEYS

INVENTOR
C. VERNON WATSON

United States Patent Office 3,389,035
Patented June 18, 1968

3,389,035
SYSTEM, APPARATUS AND PROCESS FOR THE MANUFACTURE OF METERING DIAPHRAGMS
Charles Vernon Watson, Buena Vista, Va., assignor to Reeves Brothers, Inc., New York, N.Y., a corporation of New York
Original application Mar. 14, 1961, Ser. No. 107,280, now Patent No. 3,289,550, dated Dec. 6, 1966. Divided and this application Aug. 16, 1966, Ser. No. 572,792
11 Claims. (Cl. 156—242)

ABSTRACT OF THE DISCLOSURE

Apparatus for vacuum molding metering diaphragms comprising vacuum molds having mold faces defining the shape of the diaphragm and vacuum distributing grooves therein, sealing rings for clamping the periphery of the diaphragm to the vacuum molds before the vacuum is applied, central discs and/or gaskets for bonding to the diaphragm as desired, and means for pressing the diaphragm into the vacuum mold to aid in the vacuum molding if desired.

---

This invention relates to manufacturing precision molded articles and, more particularly, to the precise art of manufacturing diaphragms employed in measuring instruments and equipment such as gas meters.

This application is a division of copending application Ser. No. 107,280 filed Mar. 14, 1961, now U.S. Patent No. 3,289,550.

The manufacture of diaphragms for gas measuring equipment is highly precisional and specialized, requiring the highest possible degree of skill and reproducible accuracy. Each diaphragm must have a particular configuration and whether they are circular, oval, square, rectangular, trapezoidal or otherwise shaped, they must be identical with each other diaphragm of the the same shape in order to be capable of providing the same, consistently accurate, measurements when installed in measuring apparatus. For example, when the diaphragms are circular, they must have identical radial cross-sections in all directions in order to be reliable. Any flaws or differences in the radial cross-sections give rise to unpredictable resistances to the proper flexure of the diaphragm resulting in inconsistent movements thereof and unpredictable measurements. In some cases, such inconsistencies can be corrected but, in most cases, no correction is possible.

Heretofore, diaphragms for gas meters and other fluid measuring equipment were made by skilled artisans using hand techniques in the efforts to obtain reasonably reproducible accuracy required by users of measuring equipment. These prior manufacturing methods, of necessity, were time-consuming, requiring several hours for the production of a diaphragm.

It is therefore a primary object of this invention to provide for the manufacture of diaphragms which are precisely shaped and weighted.

Another object is to provide a process and apparatus for manufacturing precision diaphragms, each being of substantially the same characteristics as each other made by the same process.

A further object is the provision of a system, process and apparatus for the precision manufacture of large quantities of accurately molded meter diaphragms at a high rate and with the least amount of manual labor.

A further object is the provision of a system, process and apparatus for manufacturing many types of meter diaphragms having the above characteristics.

A still further object is to provide a system, apparatus and method which are interchangeable for, and readily adapted to, making any one of several types of diaphragms having the above characteristics.

Another object is the provision of novel meter diaphragms which are superior to those heretofore known in measuring precision.

Another object is the provision of novel diaphragms which are superior to prior diaphragms in the reduction of inertial resistance in the portions thereof which are displaced in effecting measurements by meters in which they are installed.

Another object is to provide novel diaphragms which are more accurate, rugged and durable and simpler to install than heretofore known diaphragms.

Further objects and advantages of this invention will be apparent from the following detailed description of several embodiments thereof described in conjunction with the attached drawings, of which.

The present invention provides novel diaphragms of high precision and a system, process and apparatus for manufacturing such diaphragms in mass quantities at high production rates. The new gas meter diaphragms of this invention are capable of greater measuring accuracy and are more durable and reliable, less expensive and easier to produce than heretofore-known gas meter diaphragms. By the practice of this invention, it is now possible to manufacture superior gas meter diaphragms in a fraction of the time previously required.

Figure 1:
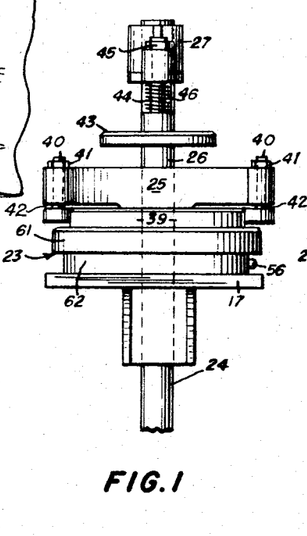
FIG. 1 is a front elevation in cut-away of one station of said turret molding apparatus.
Figure 2:
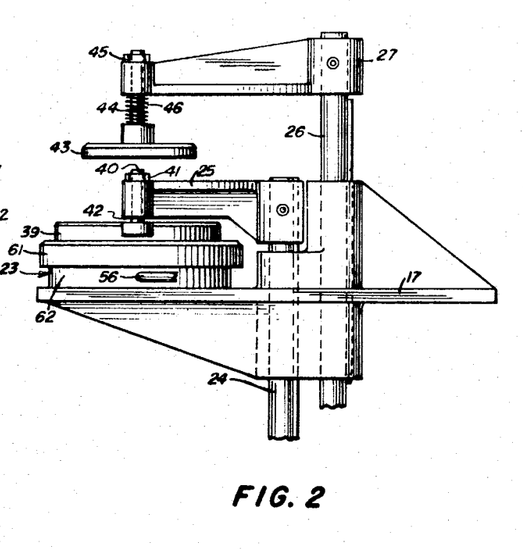
FIG. 2 is a side elevation of said station shown in FIG. 1.

Referring now to FIGS. 1 and 2, there is shown a platen 17 on which is mounted a vacuum mold 23 which is suitably connected to a vacuum supply (not shown). Means for heating the vacuum mold, e.g., circulating heated oil, electrical, radiant, high frequency means, etc., are also provided (not shown).

Inwardly from the vacuum mold, there is slidably mounted on a platen 17, a first rod 24 having attached to its upper end a yoke 25 which extends outwardly over said vacuum mold 23. A second rod 26 is slidably mounted on the platen 17 inwardly from the first cam rod 24. To the upper end of the second rod it attached an arm 27 which extends outwardly over vacuum mold 23. The arms of the yoke 25 extend outwardly above the vacuum mold 23, and, at diametrically opposed points above the periphery of the vacuum mold 23, slidably mount a retaining ring 39 by means of pins 40 and nuts 41. A compression spring 42 is interposed on the pin 40 between the retaining ring 39 and the arms of the yoke 25. A sufficient tolerance is provided between the pin 40 in the arm of the yoke 25 so as to permit the proper alignment of the retaining ring 39 with the top of the vacuum mold 23.

The arm 27 slidably mounts a pressure pad 43 concentrically over the vacuum mold 23 by means of a pin 44 and nut 45. A compression spring 46 is interposed around the pin 44 between the arm 27 and the pressure pad 43 and sufficient tolerance is provided between the pin 44 and the arm 27 to permit the proper alignment of the pressure pad 43 with respect to the upper face of the vacuum mold 23.

It will be noted also that fine adjustments can be made to the pressure pad 43 by turning the nut 45 to vary the height of said pressure pad over the vacuum mold 23 as desired. The retaining ring 39 can also be adjusted to provide fine alignment with the vacuum mold 23 by turning one or both of nuts 41 to raise, or lower, one, or both, sides of said retaining ring as desired.

The rods 24 and 26 can be moved in up-and-down action by manual means although it is preferable to do so by employing any well known mechanical means.

Figure 3:
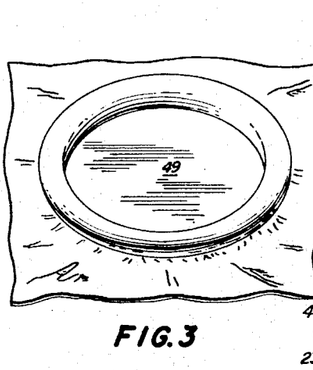
FIG. 3 is a perspective view of one type of flexible diaphragm made by the process and apparatus of this invention.
Figure 4:
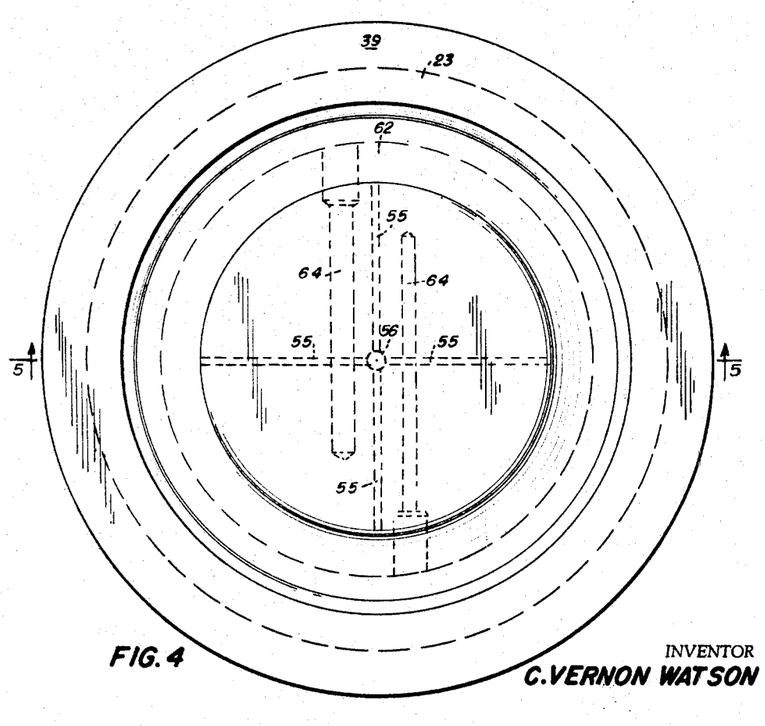
FIG. 4 is a plan view of one type of vacuum mold employed in making the diaphragm shown in FIG. 3.
Figure 5:
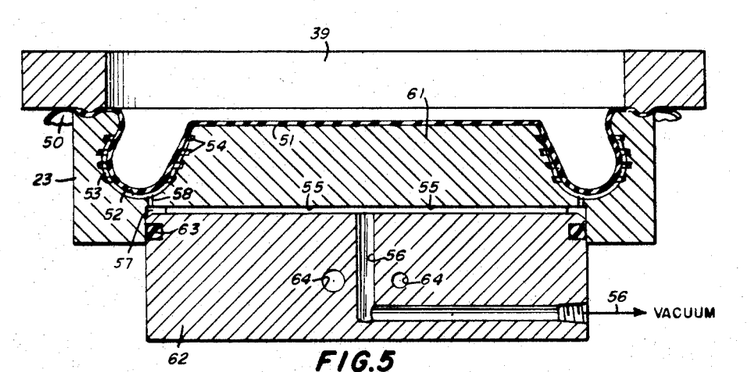
FIG. 5 is a cross-section taken on line 5—5 of FIG. 4.

A description of the various novel vacuum molds 23 which can be employed will provide a clearer understanding of the operation of the molding system described hereinabove. FIG. 3 illustrates one type of a diaphragm 49 which can be made by the present invention employing the vacuum mold shown in FIGS. 4 and 5. The diaphragm 49, as shown, is in the condition as it is removed from the vacuum mold and before the excess material of the diaphragm blank is trimmed from the periphery thereof. FIGS. 4 and 5 illustrate the vacuum mold 23, a diaphragm blank 50 and the retaining ring 39 engaging said blank and said mold, wherein vacuum is being applied to the mold to impart the desired shape to the mold blank 50. The vacuum mold 23 has an upper face 51 defining the shape of the desired diaphragm. The central portion of the upper mold face is planar and circular. The outer portion of the mold face 51 comprises a peripheral valley 52 and radial vacuum distributing grooves 53 extend through this portion to the peripheral edge of the mold face. Several concentric vacuum distributing grooves 54 are also provided on the surface of the peripheral valley 52 to further distribute the vacuum evenly to all points on the mold face. It is preferable that the radial and concentric vacuum distributing grooves (respectively, 53 and 54) are fine enough to prevent pulling of the diaphragm material into the grooves which causes weak points in the finished diaphragm. Said grooves should not be so fine, however, that lubricating material such as cornstarch on the diaphragm blank or other fine extraneous matter clog the vacuum distributing system. Vacuum branch lines 55 are provided internally of the vacuum mold 23 and extend radially from the center of said mold. The vacuum branch lines 55 intersect at the center of the mold 23 and communicate with vacuum supply passageway 56 so as to distribute vacuum to an annular conduit 57 which communicates through ports 58 with vacuum distributing grooves 53 and/or 54 at various points in the bottom of the peripheral valley 52.

In the embodiment shown in FIGS. 4 and 5, the vacuum mold 23 comprises two pieces, an upper piece 61 having the mold face 51 on its upper surface and a concentric cylindrical recess in its lower surface, and a lower piece 62 fitting into the cylindrical recess of the upper piece 61 and being sealed thereto by means of sealing ring 63. The vacuum branch lines 55 are formed as grooves in the undersurface of upper piece 61 and the upper surface of the lower piece 62 forms the lower wall of said branch lines. Similarly, the annular conduit 57 is formed as an annular recess in the undersurface of upper piece 61 and the upper surface of the lower piece 62 forms the lower wall of said annular conduit 57. The mold can be heated in any suitable manner such as by electrical heating elements inserted into bores 64 formed in the lower piece 62 or by circulating heated oil through canals (not shown) formed in said lower piece 62.

Figure 11:
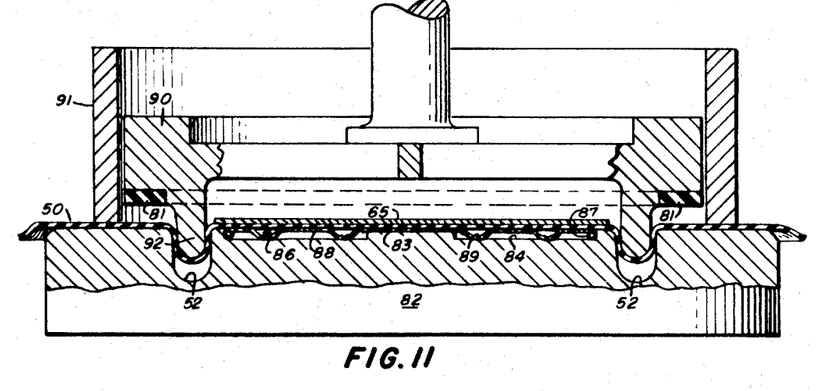
FIG. 11 is a cross-sectional elevation of one type of vacuum mold and associated pressure ring and retaining ring which can be used for making the diaphragm shown in FIG. 10.

In operation, a mold blank 50 of a suitable yieldable, curable, impermeable sheet material is placed over the entire upper face of the mold 23. The retaining ring 39 is lowered into pressure contact with the diaphragm blank 50 such that the retaining ring 39 forces the diaphragm blank material into tight pressure engagement with the upper annular surface of mold 23 and thus tightly seals the diaphragm blank over the mold face 51. Vacuum is then applied through passageway 56 to draw the diaphragm blank 50 into conforming engagement with the mold face 51. Additional means can be employed for ensuring the faithful conformation of the diaphragm blank 50 to the shape of mold face 51. For example, superatmospheric air pressure can be momentarily applied above the blank 50 or a male mold comprising an annular protuberance substantially fitting into peripheral valley 52 can be lowered into operative engagement by pressure pad 90, as shown in FIG. 11. The retaining ring 39 not only seals the diaphragm blank 50 to the mold face 51, but also controls and guides the movement of said blank as it is drawn into conformance with said mold face and thus operates to hinder and prevent undesirable wrinkles in the diaphragm membrane or free area. The mold 23 can be kept at high temperature by the above-mentioned heating means so that the diaphragm blank is cured and set into the desired shape. Alternatively it can be heated to curing temperature after application of vacuum.

Figure 6:
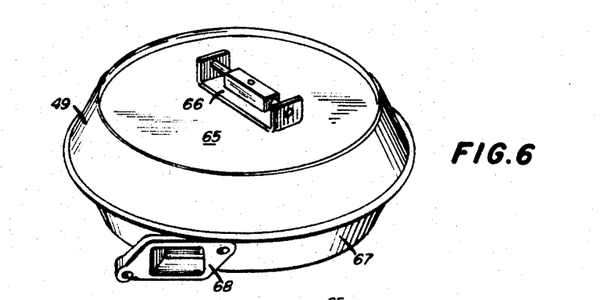
FIG. 6 is a perspective view of another type of diaphragm assembly made by the present invention.

A type of diaphragm assembly is illustrated in FIG. 6. This type of diaphragm assembly comprises a center disc 65, having a bracket assembly 66 mounted thereon, which is bonded concentrically to a planar central portion of a flexible diaphragm 49 similar to that shown in FIG. 3. The peripheral edges of the diaphragm 49 are bonded to the peripheral lip of a diaphragm pan 67. The diaphragm 49, as shown, is in its extended position wherein the center disc 65 is at or near its greatest distance of separation from the diaphragm pan 67. The bracket assembly 66 permits pivotal connection of the center disc 65 to the measuring mechanism of a gas meter (not shown), or other devices, in which the diaphragm assembly shown in FIG. 6 is installed. The diaphragm pan 67, similarly, has a vent fixture 68 which co-operates with the mechanism of the gas meter in which the diaphragm assembly is to be installed.

Figure 7:
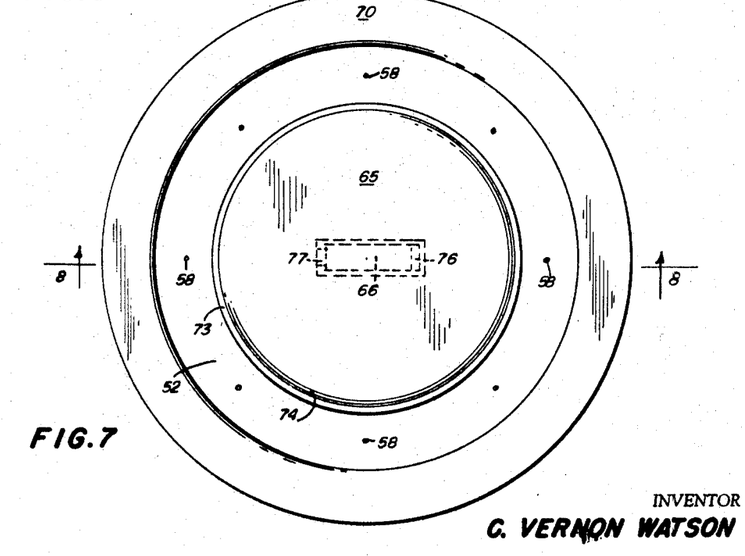
FIG. 7 is a plan view of one type of vacuum mold employed in making the diaphragm of FIG. 6.
Figure 8:
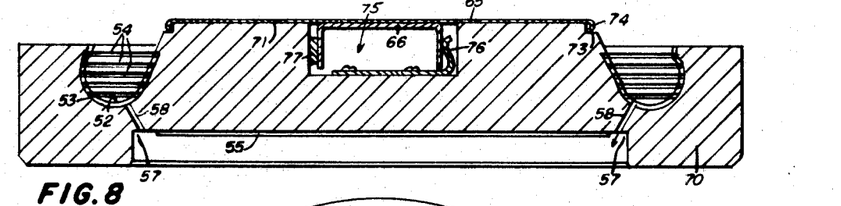
FIG. 8 is a cross-section on line 8—8 of FIG. 7.
Figure 9:
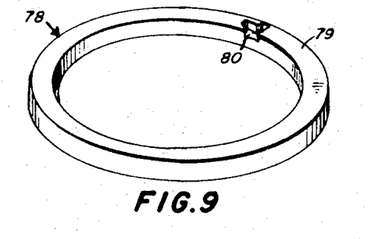
FIG. 9 is a perspective view looking down from above of one type of retaining ring to be used in conjunction with the mold shown in FIGS. 7 and 8 for making the diaphragm of FIG. 6.

The type of diaphragm assembly shown in FIG. 6 can be made in the vacuum mold shown in FIGS. 7 and 8 employing the upper mold piece 70 shown therein with the lower mold piece 62, as shown in FIGS. 4 and 5 and the retaining ring 78, shown in FIG. 9. Referring to these figures, the vacuum mold 23 has an upper mold face 71 defining the shape of the diaphragm pan 49. The central portion of the upper mold face 71 is planar and circular. The outer portion of mold face 71 comprises the peripheral valley 52 through which radial vacuum distributing grooves 53 extend to the peripheral edge of the mold face. Several concentric vacuum distributing grooves 54 are provided in the surface of the peripheral valley and an annular recess 57, radially extending vacuum branch grooves 55 and ports 58 are provided in the under, recessed surface of mold piece 70, similar to those shown in FIGS. 4 and 5. The planar circular central portion 71 of the mold face is formed with a recess 73 along its peripheral boundaries to accommodate a rolled or turned lip 74 of the center disc 65. The co-operation of said rolled lip 74 with the recess 73 assures centering of the center disc 65. A recess 75 is also provided in the center of the circular planar central portion 71 and contains a fixture comprising the spring metal strip 76 and guide block 77 mounted therein, as shown, for positioning and locating the bracket 66, which is attached as by adhesive, or other method of bonding, i.e., rivet or self-bonding or molded bracket, to the center disc 65. Thus, the center disc 65, having a heat curable adhesive layer on the surface opposite to that on which the bracket 66 is mounted, is placed on the planar central surface 71 such that the bracket is held in the recess 75 between spring strip 76 and guide block 77 and such that the rolled lip 74 of said disc fits into the annular recess 73. The diaphragm sheet material of yieldable, impermeable, heat curable sheet material, or thermo-plastic sheet material, is then laid over the center disc and the entire mold face, including the peripheral valley and at least a portion of the planar annular portions of the mold face. The diaphragm pan 67 then is placed concentrically on the mold face and centered by means of the retaining ring 78, shown in FIG. 9.

Referring to FIG. 9, the retaining ring 78 is illustrated with its under surface 79 (i.e., the surface which faces the mold when said retaining ring is in operative position) turned upwards. Recess 80 is provided in the surface 79 to loosely accommodate the fixture 68 mounted on the pan 67. The inner diameter of the retaining ring 78 can be sufficiently larger than the outer diameter of the diaphragm pan 67 so as to clear said pan and permit the surface 79 of said ring to pressure contact the diaphragm blank to seal it to the mold face. Alternatively, the inner diameter of retaining ring 78 can be slightly smaller than the largest diameter of pan 67 such that said pan can be pushed with slight pressure up into said retaining ring and held there by friction between said pan and said ring. The pressure of the retaining ring against the diaphragm blank also seals the blank to said planar peripheral portion of the mold piece 70 such that the blank can be drawn into the peripheral valley 52 upon application of vacuum through the various vacuum distribution lines, conduits, grooves, etc. When said blank is drawn into the peripheral valley 52, it pressure bears against the center disc 65 and with the aid of heat is bonded thereto. The recess 80 of said retaining ring not only accommodates the fixture 68 but can be used to center said pan with regard to the center disc 65 and the diaphragm blank and a pressure pad 43 similar to that shown in FIGS. 1 and 2 can subsequently be brought to press on the bottom of the pan 67 to force the peripheral lip thereof into pressure contact with the diaphragm blank. The outer surface of the lip of the diaphragm pan is coated with a layer of heat-curing adhesive capable of bonding the material of said diaphragm pan to the material of the diaphragm blank or sheet material. The pressure pad 43 (e.g., as shown in FIGS. 1 and 2) engages the bottom of the diaphragm pan 67 to force the adhesive-coated surface of said lip into pressure contact with the diaphragm blank or sheet material after retaining ring 78 has been brought into sealing engagement with the blank and vacuum has been applied.

Figure 10:
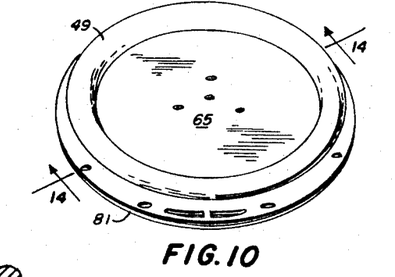
FIG. 10 is a perspective view of another type of diaphragm assembly made by this invention.

FIG. 10 illustrates another diaphragm assembly which can be made in accordance with this invention. This type of diaphragm assembly comprises a diaphragm 49 bonded to a circular, flat gasket 81. A center disc 65, similar to that shown in FIG. 6, can also be bonded to the central portion of the diaphragm 49. Similarly, a center disc 65 without the bracket 66 can also, if desired, be bonded to the central portion of the diaphragm 49.

Figure 12:
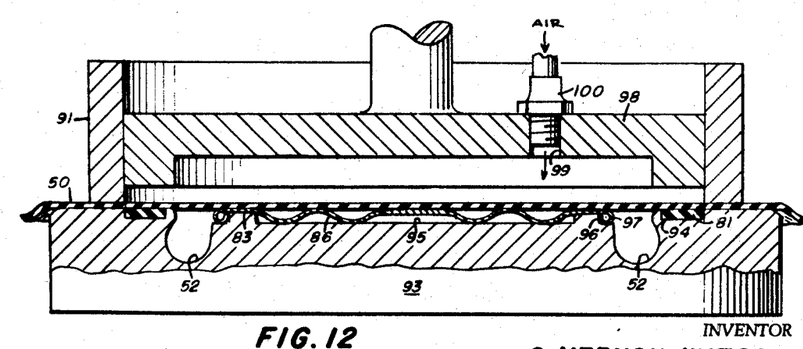
FIG. 12 is a cross-sectional elevation of another type of vacuum mold and associated pressure ring and retaining ring which can be used for making the diaphragm shown in FIG. 10.

FIGS. 11 and 12 illustrate diagrammatically upper mold pieces and associated pressure rings and retaining rings which can be employed for making diaphragms of the general type shown in FIG. 10. FIGS. 11 and 12 illustrate two different embodiments for accomplishing this and, in addition, illustrate two additional embodiments for attaching a center disc to the central portion of the diaphragm 49.

FIG. 11 diagrammatically illustrates an upper mold piece 82 which has vacuum distributing lines, conduits and grooves similar to those shown in FIGS. 5 and 8. The central portion of the mold face 83 of the mold piece 82 is provided with a wide, annular recess 84 for receiving and positioning a center disc 86. The center disc 86 has rolled peripheral edges 87 and is formed with circular crests and troughs 88 and 89, respectively, resembling circular corrugations, for added rigidity. A pressure ring 90 having an annular protuberance 92 conforming to and fitting into the peripheral valley 52 of the mold face 83 is positioned concentrically above said mold face 83 and a retaining ring 91 in the form of a hollow cylinder fits slidably around the pressure ring 90. The pressure ring 90 is mounted on the arm 27 (FIGS. 1 and 2) and the retaining ring 91 is mounted on yoke 25 (FIGS. 1 and 2) and both are adapted to be moved toward the mold face 83 of the mold piece 82 as hereinbefore generally described.

In operation, the center disc 86 is positioned in the circular recess 84, thereby locating and positioning said center disc. The upper crest surfaces 88 are coated with a layer of heat-curing adhesive capable of bonding the material of the center disc 86 to the material of the diaphragm blank or sheet material to be used. A diaphragm blank 50 comprising a yieldable, impermeable sheet material is then placed over the center disc and the entire mold face 83 and overlies planar annular portions of the upper face of mold piece 82. A flat circular gasket 81, coated on its undersurface with a layer of heat-curing adhesive capable of bonding the material of said gasket to the material of the diaphragm blank 50, is placed around the annular protuberance 92 which has an outside diameter slightly greater than the inside diameter of said gasket. In this manner, the gasket 81 is placed around the protuberance 92 and is held there by frictional contact arising from the slightly oversized diameter of said protuberance.

The retaining ring 91 is lowered to force the diaphragm blank 50 into pressure contact with the upper face of mold piece 82. The pressure contact caused by retaining ring 91 seals the peripheral boundaries of the diaphragm blank 50 to the upper face of mold piece 82, thus permitting vacuum applied to the peripheral valley of the mold to draw the diaphragm blank 50 downwardly into conformance with the shape of the mold face of the peripheral valley. The pressure ring 90 is then lowered and the protuberance 92 enters the peripheral valley 52 to assist the vacuum in faithfully conforming the blank 50 to the mold face 83. As the pressure ring 90 reaches its lowermost position, it forces the gasket 81 into pressure contact with the blank 50. Heat applied as hereinbefore described cures the blank 50 and the adhesive coatings previously described to finish the diaphragm.

The mold piece 93 shown in FIG. 12 is similar to mold piece 82 shown in FIG. 11 with the exception that a concentric, annular recess 94 is provided in the upper face thereof at a location outward from the peripheral valley 52 and the central portion of the mold face 83 is provided with a circular recess 95 and an open peripheral recess 96. The circular recess 95 receives the center disc 86 and the peripheral recess 96 receives the rolled lip 97 of said disc. The upper crest surfaces of center disc 86 is coated with an adhesive as described in regard to FIG. 11. The recess 94 accommodates the gasket 81 which has on its upper surface a coating of a heat-curing adhesive capable of bonding said gasket to the diaphragm blank 50. A retaining ring 91 similar to that shown in FIG. 11 is mounted on yoke 25 (FIGS. 1 and 2) coaxially above the mold face 83. A pressure ring 98 is mounted on arm 27 (FIGS. 1 and 2) coaxially above said mold face 83 and slidably moves within retaining ring 91. Pressure ring 98 is constructed in the form of an inverted dish having an air port 99 through its bottom. The air port 99 is connected to a suitable supply of compressed air (not shown) by means of tubing 100.

In operation, the retaining ring 91 is lowered into pressure contact with the diaphragm blank 50 to force it into pressure engagement with, and to seal, the outer periphery of the diaphragm blank 50 to the upper face of mold piece 93, thereby permitting vacuum to operate on the undersurface of said diaphragm blank to draw said blank into conformity with the mold face. The pressure ring 98 is then lowered to pressure bear against the diaphragm blank 50 over gasket 81 forcing it into pressure contact with said gasket. While said pressure ring is in its lowered position, compressed air is introduced through air port 99 to ensure that the blank 50 faithfully conforms to the surface of peripheral valley 52. The compressed air need only be introduced momentarily. Heat applied as hereinabove described completes the curing of blank 50 and setting of the adhesives.

Figure 13:
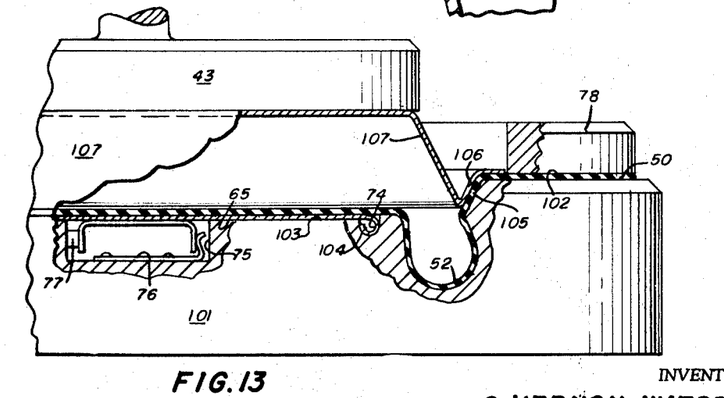
FIG. 13 is an elevation in partial section of another type of vacuum mold and associated pressure pad and retaining ring which can be used for making the diaphragm assembly shown in FIG. 6.

FIG. 13 illustrates another type of vacuum mold and associated retaining ring and pressure pad for molding diaphragms of the type shown in FIG. 6. In this embodiment, an upper mold piece 101, similar to that shown in FIG. 8, is provided with the exception that the planar peripheral portion 102 of said mold piece is raised above the central planar portion 103 and a narrow annular groove 104 in the outer portions of said central planar portion 103 is provided to accommodate the rolled lip 74 of an otherwise flat center disc 65. The bracket 66 is fixed, as by bonding, to the center, underside of disc 65 and is held in the recess 75 by spring metal strip 76 and guide block 77. The portion 105 of the mold piece 101 between the planar peripheral portions 102 and the peripheral valley 52 is tapered inwardly towards said valley 52 in the shape of the set back lip 106 of diaphragm pan 107.

The retaining ring 78 is similar to that shown in FIG. 9 and has an inner diameter slightly smaller than the largest diameter of the pan 107 such that said pan can be pushed with slight pressure up into said retaining ring and held there by friction between the inner surface of said ring and the edges of lip 106 of said pan. If necessary, longitudinal grooves can be provided on the inner surface of retaining ring 78 to permit air access to the inner portions of pan 107 when said ring, within which said pan is positioned, is brought down into sealing contact with the diaphragm blank 50.

In operation, the central disc 65 is inserted on the central portion 103 with the bracket 66 within the recess 75 and the lip 74 within the groove 104. The diaphragm blank 50 is placed over the disc 65 and mold face of mold 101. The pan 107 is pushed up into the retaining ring 78 far enough to permit access of air from above the pan through longitudinal grooves in the inner surface of said retaining ring to the bottom of said pan when said retaining ring seals against the blank 50. The retaining ring 78 is then lowered against the blank 50 to seal it against the mold 101. Vacuum is applied to draw the blank 50 into the shape of the mold face and particularly into the shape of the peripheral valley 52. Pressure pad 43 is then lowered against the bottom of pan 107 to move said pan downwardly and into pressure contact with the blank 50. The planar portion of lip 106 facing blank 50 is coated with a heat-setting adhesive capable of bonding the material of the pan 107 to the material of the blank 50. Heat is applied as hereinbefore described to cure the blank 50 and set the adhesive on lip 106. The number and size of longitudinal grooves in the inner surface of retaining ring 78 can be limited so that the downward movement of the pan 107 creates sufficient air compression within said pan to ensure faithful conformance of the blank 50 to the valley 52.

Figure 14:
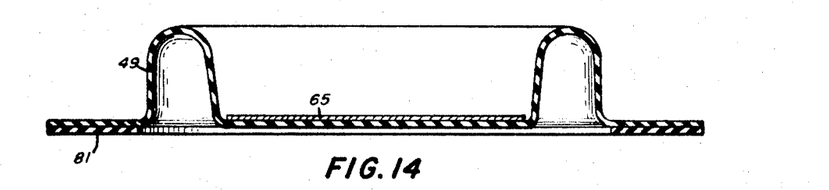
FIG. 14 is a cross-sectional view of a diaphragm similar to that shown in FIG. 10.
Figure 15:
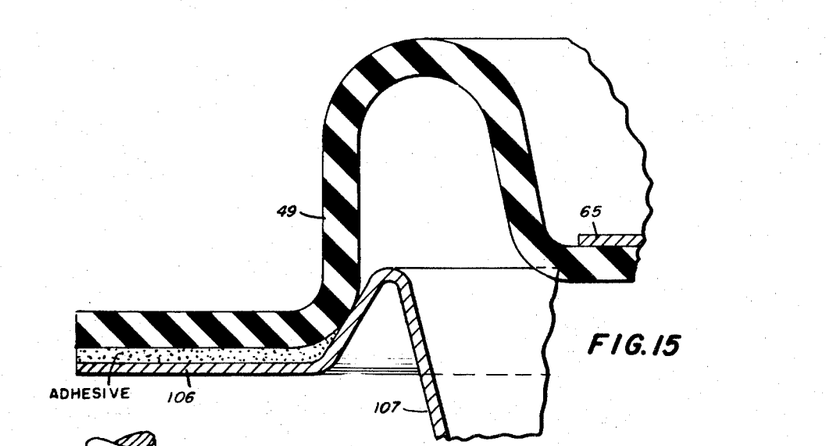
FIG. 15 is an enlarged fragmentary cross-sectional view of a diaphragm assembly similar to that shown in FIG. 6.

FIGS. 14 and 15 illustrate cross-sections of two types of superior diaphragms made in accordance with this invention. An important feature in the superiority of these diaphragms is the uniformity of juncture of the diaphragm 49 with the gasket 81 (FIG. 14) or lip 106 (FIG. 15). As opposed to prior art diaphragms which involved tying the diaphragm 49 to a perpendicular inner flange on a circular frame similar to gasket 81, the novel diaphragms shown in FIGS. 14 and 15 have a more uniform free area, i.e., area between center disc 65 and the juncture with the gasket 81, or lip 106, and a uniform circumferential juncture of free area and gasket or lip in the plane of the gasket or lip, thus providing consistent accuracy in an individual diaphragm and/or from diaphragm to diaphragm. The pan and diaphragm construction shown in FIG. 15 provides an additional advantage in that there is no tendency of the free area to snap out as the center disc is moved from one extreme to the other as is prevalent in heretofore known pan and diaphragm constructions. Instead, the free area of the novel pan and diaphragm construction (FIG. 15) tends to smoothly roll out on movement of the center disc from one extreme to the other, thus avoiding error-inducing and damaging wrinkles in the free area.

Referring now to FIGS. 1 and 2 in particular, the operation of the molding system shown therein and described hereinabove will now be described in detail. The vacuum mold 23 which will provide the desired molded diaphragm is placed in its position on the platen 17 and its associate retaining ring 39 is suitably mounted on the yoke 25 as hereinabove described. In this connection, a typical molding cycle would consist of the following sequence:

(1) With the pressure pad or ring (43, 90 or 98) and retaining ring (39 or 91), in raised position above the vacuum mold 23, and vacuum valve in the off position such that no vacuum is being applied, the diaphragm blank, center disc, gasket and/or diaphragm pan are inserted in the proper sequence.

(2) The retaining ring is lowered to force the diaphragm blank into vacuum-sealing engagement with the upper surface of the mold 23.

(3) The vacuum valve is actuated, and vacuum is applied and maintained for a sufficient length of time to permit curing or setting of the diaphragm blank and adhesive on the center disc, if used. After the diaphragm blank has been drawn into the mold, the pressure pad or ring is lowered to force the diaphragm blank and the gasket or lip of the diaphagm pan into pressure engagement and maintained there until the adhesive on the gasket or lip has set.

(4) The vacuum valve is then turned off, releasing the vacuum in the mold.

(5) The pressure pad or ring and retaining ring 39 are raised.

At the time where the retaining ring and pressure pad are in their uppermost positions and the vacuum valve is in its off position, e.g., step 1 in the above sequence (just preceding the time where said retaining ring and said pressure pad are lowered, an operator inserts the necessary diaphragm assembly parts such as the diaphragm blank, center disc, gasket and/or pan. At the end of step 5 and preceding step 1, the operator removes the molded diaphragm and/or diaphragm assembly and then inserts the necessary parts for the next cycle. The above-mentioned sequence is only illustrative and various changes and substitutions can be made as desired, or needed, without departing from the scope of this invention.

In place of manual feeding and manual removing of molded and assembled articles, automatic mechanical feeding and removal can be employed to take the place of operators. Also, the diaphragm blank employed can be of the exact diametrical size as the finished diaphragm desired; in which case no trimming of excess material from the finished diaphragm is necessary. Alternatively, a diaphragm blank of substantially rectangular, circular, oval or octagonal shape can be employed; in which event, a suitable trimming device will be necessary to cut off excess material.

It is preferable to maintain the vacuum mold at a suitably high temperature for curing the diaphragm blank in the mold. However, if desired, the temperature can be varied somewhat by switching means wherein, for example, the mold will be heated at a time while vacuum is being applied and the heat turned off at a time when no vacuum is being applied. In any event, it is sufficient to maintain the mold 23 at the necessary high temperature by continuously heating said mold, for example, by electrical means or by circulating oil.

The diaphragm blank material is any suitable material having properties fitting the conditions for which the diaphragm is intended. For example, in gas metering, the diaphragm blank material ordinarily used is a woven fabric of cotton or other textile fiber which is coated on both sides with a curable, dry mixture of various synthetic and natural polymers and fillers which, after curing, will provide a flexible, gas-impermeable laminate capable of resisting attack by oils, hydrocarbons and other materials with which the finished diaphragm is brought into contact. A particularly advantageous type of diaphragm blank material is a non-woven sheet of cotton or other fibers, some of which are parallelly oriented in one direction and others of which are parallelly oriented in another direction angular to the first direction and all of which are surrounded and bonded together by a natural or synthetic rubber compound which can be the above-mentioned curable, dry mixture. The gasket bonded to the diaphragm in accordance with the invention can be of any suitable gasketing material, e.g., cork fibers bonded together by a resin, oil or other suitable binding agent; Buna N rubber; cork-filled Buna N rubber; gum rubber; cork-filled gum rubber; or any other material suitable for gasketing. As thermosetting adhesives for bonding the diaphragm to the gasket, center disc and/or diaphragm pan, there can be used any bonding material which will dry to a substantially non-tacky condition after application at normal temperatures but which will give suitable adhesion after applying heat and pressure without deteriorating the flexibility, impermeability or aging properties of the cured diaphragm. As examples, an epoxy-resin based cement satisfactorily bonds the diaphragm to metals or other materials and shellac satisfactorily bonds the diaphragm to the gasket material. Instead of employing a thermosetting adhesive, the diaphragm can be directly vulcanized to the gasket, pan and/or disc. The pan and center disc is made of a suitably rigid material, e.g., metal or suitably rigid synthetic plastic. The center disc is preferably light weight and can be made of a light-weight metal or plastic material or bonded fiber.

As compared with the prior methods and apparatus, this invention provides a remarkable step forward in the art of molding diaphragms. One outstanding advantage of this invention is the extraordinary reduction in the time required for molding diaphragms of from several hours to several minutes per diaphragm and the elimination of the bulky and expensive equipment, such as oven rooms and trucks for moving assembled molds from the mold assembly area into the oven room for curing and out again for cooling and disassembly, heretofore employed. Furthermore, the production rate of the vacuum molds described and claimed herein is far superior to heretofore-known molds and far more diaphragms can be produced with far fewer molds than heretofore possible.

As a result of the new and improved system, method and apparatus of this invention, far superior diaphragms of the known variety can be made. In using the present vacuum molding system, method and apparatus, uniform stretching and distribution of the diaphragm blank material is obtained in forming the desired diaphragm as opposed to the dependence of heretofore-known methods and apparatuses on the judgment and strength of the operator in pulling at the corners of the blank material while shaping the diaphragm. As a result, far fewer rejects are experienced by practicing this invention. Higher yield from and fuller utilization of blank material is permitted by this invention, since the "ears" or "handles" (i.e., corners) of the heretofore necessarily square or rectangular blanks are no longer needed for manually stretching the blank in the mold. Now the diaphragm blank can be cut in the approximate outline of the desired diaphragm and little, if any, blank material is wasted in making the diaphragm blank and/or tin trimming excess blank material (e.g., "ears" or "handles") from the finished diaphragm.

Less rejects because of scuffing, scraping, tearing, puncturing, etc., are obtained by the use of the novel system, method and apparatus, since the use of springs or clamps (required in the prior art hand method to clamp the shaped diaphragm blank prior to curing) and the necessity for stacking loaded molds on trucks for further transport into an oven room and other handling of loaded molds are eliminated. Also, by practicing this invention there are less rejects caused by uneven flow of curable component in the blank material brought on by non-uniformity of pressure on the shaped blank during curing in heretofore-known methods and equipment wherein greater pressures occured in areas of the blank which were perpendicular or more perpendicular to the pressure direction of the male and female molds. Because of the elimination of causes for scuffing, tearing, scraping, puncturing, etc., and the substantially uniform application of pressure over the entire shaped area of the diaphragm blank (thus averting the uneven flow of curable component of the blank), the present invention can permit the use of blank material having the curable component in a substantially uncured state or having lower degree of pre-cure.

The novel diaphragm and diaphragm assemblies of this invention are remarkably superior to heretofore-known diaphragms and assemblies in measuring accuracy, accurate reproducibility, durability (not only of the diaphragm or assembly but also of the equipment in which it is used), duration of accuracy, capacity, quietness of operation, etc. The center disc when employed in a novel diaphragm assembly is always precisely centered in the proper place in the central area of the diaphragm membrane, thereby providing accurate reproducibility of diaphragm operation as opposed to prior art methods of attaching the center disc, e.g., manually, after the diaphragm membrane has been shaped and cured, resulting in eccentric attachments and lower operating accuracy and differences in operating characteristics from diaphragm to diaphragm which differences necessitated separate and different compensating corrections for each diaphragm. Additionally, the use of but one center disc, instead of the two needed by the prior art, and the use of light-weight materials in the center discs provide the novel diaphragms and/or assemblies with an extremely light-weight center area, thus, reducing power absorption during use and higher operational capacity, reducing diaphragm reversal at the extreme "in" or "out" stroke and giving better proof repeatability or permitting the use of lighter weight (viz. less costly) membrane material, reducing the noise level from movements of the diaphragm and associated equipment, and other outstanding advantages, including, ease of assembly, less wear on parts associated with the diaphragm and less break-down in the field.

Similarly, the pan or gasket when employed in a novel diaphragm assembly is always properly centered with respect to the diaphragm membrane, and diametrical and circumferential distortion is eliminated, since clamping bands, wires, springs, etc., heretofore employed in diaphragm assemblies are obviated. As a result, the novel diaphragm assemblies have little tendency toward "crowfooting" of the membrane and excessive wear of associated parts such as was experienced in the prior art assemblies. Furthermore, because of the more uniform alinement of the membrane, pan and/or gasket of the novel diaphragm assemblies, superior reproducible proofs result, both immediately and during the service life of the equipment in which the assemblies are used, and the total differentials and differential "breaks" or "fluctuations" during a single cycle are favorably handled. Additional outstanding advantages are available by practicing the invention and include elimination of costly and sometimes troublesome strings, springs, clamps, rivets, bands, etc., previously used and the time, effort and facilities for attaching such fixtures.

Diaphragms and diaphragm assemblies for use in gas measuring devices, gas pressure regulators, aqua-lungs, fuel pumps, air compressors for portable spraying equipment, pressure-responsive control apparatus and the like can be manufactured by employing the principles and detailed teachings of this invention. Such diaphragms can be of any size or shape, e.g., circular, oval, square, rectangular, trapezoidal, "cylindrical" or otherwise. The diaphragm membrane can be of any desired configuration, e.g., a single convolute, multiple convolutes or otherwise. The diaphragm assemblies in accordance with this invention furthermore can be so shaped as to define a relatively deep cavity with the diaphragm membrane forming the side walls as free area and the bottom wall which can be the relatively rigid area as by bonding to a light-weight relatively rigid member, e.g., as in a "cylindrical" or loop diaphragm. Various other modifications and changes can be made to this invention without departing from the principle and spirit of this invention as set forth in the appended claims.

What is claimed is:

1. Process for molding integral meter diaphragms formed with a central portion, an intermediate membrane portion around said central portion defining a flexing area of said diaphragm and a peripheral portion around said membrane portion, said peripheral portion being bonded to an element formed with an endless peripheral lip and a free area between the inner periphery of said lip, said lip being formed on the substantial shape of said peripheral portion, said process comprising, overlying a mold face defining said central portion, said membrane portion and said peripheral portion of said diaphragm with a sheet of curable, yieldable, impermeable diaphragm membrane material; resiliently pressing said sheet to said mold face around that area of said mold defining said peripheral portion to releasably seal said sheet to said mold face; thereafter forming said sheet into substantially over-all, faithful contact with said mold face with the application of vacuum from said mold face to said sheet; pressure-contacting said lip of said element with the surface of said sheet corresponding to said peripheral portion, the surface of said gasket in contact with said sheet being coated with a dry, curable adhesive; and curing said sheet and said adhesive during the application of vacuum to complete said meter diaphragm.

2. Process as claimed in claim 1 wherein said element is a gasket and said mold face has a recessed region around said area defining said membrane portion, said recessed region is of a size and shape to receive said gasket and said gasket is positioned in said recessed region prior to said overlying step and has its outward face thereof coated with a dry, curable adhesive.

3. Process as claimed in claim 1 wherein said element is a gasket and said gasket is pressure-contacted with said sheet after said overlying and resiliently pressing steps.

4. Process as claimed in claim 1 wherein a center member of light-weight, relatively rigid material having a shape similar to that of said central portion is positioned on that area of said mold face defining said central portion prior to said overlying step.

5. Process as claimed in claim 1 wherein said element is a pan having a bottom wall and a side wall extending at an angle from said bottom wall and peripherally terminating in said lip.

6. A process for molding integral diaphragms having a light-weight central portion defining a relatively rigid portion of said diaphragm and a membrane portion around said central portion defining a flexing area of said diaphragm, said process comprising, positioning a center member of lightweight, relatively rigid material in a vacuum mold having a mold face provided with an area defining said membrane portion and a central area substantially defining said central portion, said center member being shaped to fit and positioned within that area of said mold face defining said central portion and having its outward face coated with a dry, curable adhesive; overlying the entire mold face and center member with a sheet of curable, yieldable, impermeable diaphragm membrane material; releasably sealing said sheet to said mold face around said area thereof defining said membrane portion; thereafter forming said sheet into substantially over-all, faithful contact with said mold face and center member with the application of vacuum from said mold face to said sheet; and thereafter curing said sheet and said adhesive during the application of vacuum to complete said diaphragm.

7. Vacuum molding apparatus for manufacturing precision diaphragms having flexible outer portions and a relatively rigid central portion from a sheet of curable, yieldable, impermeable material and relatively rigid central discs having rolled edges, comprising a vacuum mold having a circular mold face with a concentric circular planar central portion, a concentric circular recess in the outer areas of said central portion for receiving the rolled edges of said central disc, a circular trough around said central portion, said trough defining the flexible outer portions of said diaphragm and said central portion defining the substantially rigid central portion of said diaphragm and said face having interconnecting, narrow, vacuum-distributing grooves; channel means within said mold for connecting said vacuum-distributing grooves to an external vacuum supply; heating means associated with said mold for heating it to elevated temperatures; and releasable clamping means for sealing said sheet material over said mold face prior to application of vacuum and to control displacement of said sheet material from said edge portions.

8. Vacuum molding apparatus as claimed in claim 7 for manufacturing precision diaphragms having flexible outer portions and a relatively rigid central disc having mounted thereon a fixture for connection of said disc to operating mechanism of a device in which said diaphragm is to be installed, said apparatus wherein the central portion of the mold face is provided with a recess for receiving said fixture mounted on said central disc.

9. Vacuum molding apparatus for manufacturing precision diaphragms having flexible inward portions and relatively rigid outer edge portions from a sheet of curable, yieldable, impermeable diaphragm membrane material to form said flexible portions and a more rigid gasket to form said relatively rigid outer edge portions, comprising, a vacuum mold having a mold face defining the shape of said diaphrgam, said mold face having a recess in the form of said gasket in its outer edge portions for receiving said gasket substantially flush with the adjacent surfaces of said mold face, and said face having interconnecting, narrow, vacuum-distributing grooves; channel means within said mold for connecting said vacuum-distributing grooves to an external vacuum supply; heating means associated with said mold for heating it to elevated temperatures; and releasable clamping means for sealing said sheet material over said mold face prior to application of vacuum and to control displacement of said sheet material for said edge portions.

10. The molding apparatus as claimed in claim 9 wherein pressure means are provided for substantially uniformly pressing the parts of said sheet lying over said outer edge portions toward said gasket disposed in said recess.

11. Vacuum molding apparatus for manufacturing precision diaphragms comprising a diaphragm assembly having flexible inward portions and a diaphrgam pan having a lip secured to the outer edge portions of said diaphragm, comprising a vacuum mold having a mold face defining the shape of said diaphragm, said face having interconnecting, narrow, vacuum-distributing grooves; channel means within said mold for connecting said vacuum-distributing grooves to an external vacuum supply; heating means associated with said mold for heating it to elevated temperatures; releasable clamping means for sealing said sheet material over said mold face prior to application of vacuum and to control displacement of said sheet material from said edge portions; and pressure means associated with said mold for pressure-contacting the lip of said pan with the outer edge portions of said diaphragm.

References Cited
UNITED STATES PATENTS

| | | | |
|---|---|---|---|
| 2,444,394 | 6/1948 | Arnold | 156—228 XR |
| 2,814,077 | 11/1957 | Moncrief | 18—35 |
| 2,945,976 | 7/1960 | Fridrich et al. | 156—285 XR |
| 2,998,343 | 8/1961 | Gold et al. | 156—242 |
| 3,032,462 | 5/1962 | Saporito | 156—242 |
| 3,162,899 | 12/1964 | Watson | 264—90 XR |

EARL M. BERGERT, *Primary Examiner.*

R. KILLWORTH, *Assistant Examiner.*